United States Patent
Koniki et al.

(10) Patent No.: US 10,341,293 B2
(45) Date of Patent: Jul. 2, 2019

(54) TRANSPARENT FIREWALL FOR PROTECTING FIELD DEVICES

(71) Applicant: HONEYWELL INTERNATIONAL INC., Morris Plains, NJ (US)

(72) Inventors: Ramesh Babu Koniki, Karnataka (IN); Anand Narayan, Karnataka (IN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 186 days.

(21) Appl. No.: 15/439,638

(22) Filed: Feb. 22, 2017

(65) Prior Publication Data

US 2018/0241719 A1    Aug. 23, 2018

(51) Int. Cl.
| H04L 12/66 | (2006.01) |
| H04L 29/06 | (2006.01) |
| H04L 29/08 | (2006.01) |

(52) U.S. Cl.
CPC .......... *H04L 63/0245* (2013.01); *H04L 12/66* (2013.01); *H04L 67/10* (2013.01); *H04L 67/12* (2013.01); *H04L 63/0823* (2013.01); *H04L 63/1425* (2013.01)

(58) Field of Classification Search
CPC . H04L 63/0245; H04L 12/66; H04L 63/0823; H04L 63/14; H04L 67/10; H04L 67/12
See application file for complete search history.

(56) References Cited

U.S. PATENT DOCUMENTS

| 2013/0094500 | A1 | 4/2013 | Rotvold et al. |
| 2014/0033295 | A1 | 1/2014 | Batke et al. |
| 2014/0259099 | A1 | 9/2014 | Brandt et al. |
| 2015/0378356 | A1* | 12/2015 | Hefeeda ............ G05B 19/0426 700/9 |
| 2016/0050225 | A1 | 2/2016 | Carpenter et al. |
| 2016/0308898 | A1 | 10/2016 | Teeple et al. |
| 2016/0366161 | A1 | 12/2016 | Mehta et al. |

OTHER PUBLICATIONS

Johnson (Hybrid Communication: A Closer Look at HART, 3 pages, Oct. 1, 2000) (Year: 2000).*
Stouffer et al. (Guide to Industrial Control Systems (ICS) Security, NIST Special Publication 800-82, 247 pages, May 2015) (Year: 2015).*

* cited by examiner

*Primary Examiner* — Oleg Korsak
(74) *Attorney, Agent, or Firm* — Neil R. Jetter; Jetter & Associates, P.A.

(57) ABSTRACT

A field device firewall includes a processor that runs a cyber-protection algorithm, and a memory storing a list of device types, requests and commands. The field device firewall is adapted for use in a communications network between a field network communication interface coupled to a field device and a process controller. The field device firewall does not support any native communications with the field device and also lacks an IP address. The cyber-protection algorithm implements comparing information in a received packet to the stored list, allowing transmission of the received packet to the field device if the comparing determines the information is on the stored list, and blocking transmission of the received packet to the field device if the comparing determines the information is not on the stored list.

16 Claims, 3 Drawing Sheets

TRANSPARENT FIREWALL FOR PROTECTING FIELD DEVICES

FIELD

Disclosed embodiments relate to firewalls for protecting field devices from intrusion and activities of malicious entities coupled through an industrial communications network that the field device is connected to.

BACKGROUND

Industrial facilities produce a variety of products and materials and can support processes such as petroleum refining, chemical processing, pharmaceutical production, and pulp and paper production. The process control system (e.g., Distributed Control System, Programmable Logic Controller, safety system, or supervisory control and data acquisition (SCADA) system) and measurement network employed includes a large number of field devices such as sensors and actuators which communicate with a control room.

Conventionally, field devices in a given industrial facility communicate over a process control loop with a control room and/or other field devices via wired connections. An example of a wired process communication protocol is known as the Highway Addressable Remote Transducer (HART) protocol. The HART Protocol makes use of the Bell 202 Frequency Shift Keying (FSK) standard to superimpose digital communication signals at a low level on top of a 4 to 20 mA analog signal. This enables two-way field communication to take place and makes it possible for additional information beyond just the normal process variable to be communicated to/from a smart field device.

HART communication is one of the most commonly used communication protocols used in the process industries. HART protocol is quite popular in safety systems and in most cases HART devices are connected either through serial/Internet Protocol (IP) HART multiplexers or going forward through FDI (Field Device Integration) communication servers (IEC 62769-Part 7 using Object Linking and Embedding (OLE) for process control (UPC) Unified Architecture (UA). With the advent of Industrial Interned of Things (HOT) it is also now possible for industrial facilities to access the Internet and to be accessed from Internet. Internet connectivity provides the ability to interact with the industrial facility from essentially any connected IP computer or computing device around the globe.

The industrial network may thus be susceptible to both internal and external cyber-attacks. As a preventive measure from external cyber-attacks, firewalls or other security measures may be taken to try to separate the industrial network from other networks.

SUMMARY

This Summary is provided to introduce a brief selection of disclosed concepts in a simplified form that are further described below in the Detailed Description including the drawings provided. This Summary is not intended to limit the claimed subject matter's scope.

Disclosed embodiments recognize Internet connectivity provides the potential for a malicious entity (e.g., a hacker) to attempt gain access to industrial network to wirelessly influence the industrial facility. Disclosed embodiments also recognize field devices (e.g., sensors, switches and actuators) using HART and other protocol connected to various industrial networks (control, safety, SCADA, wireless) over a field network are thus vulnerable to cyber-attacks including viruses, malware or untrusted software attacks which can tamper with the device's configuration while the field device is in use, thereby upsetting the generally critical process or safety operation that they are serving. Although some firewalls and related methods are available protecting field devices from cyber-attacks, known firewalls support 'native' wireless communications (industrial wireless protocols such as ISA100 or Wireless HART) with the field devices and also have an IP address on the industrial network which are both recognized to have associated problems.

One disclosed embodiment comprises a field device firewall for cyber protecting field devices. The field device firewall includes a processor that runs a cyber-protection algorithm, and a memory storing a list of device types, requests and commands. The field device firewall is adapted for use in a communications network of a control system between a field network communication interface coupled to a field device and a process controller. As used herein a "process controller" is defined broadly to be a controller within for example a Distributed Control System (DCS), Programmable Logic Controller (PLC), safety system, or supervisory control and data acquisition (SCADA) system, either connected by wire (e.g., cable) or wirelessly. The field device firewall does not support any native communications with the field device and also lacks an IP address. The cyber-protection algorithm implements comparing information in a received packet to the stored list, allowing transmission of the received packet to the field device if the comparing determines the information is on the stored list, and blocking transmission of the received packet to the field device if the comparing determines the information is not on the stored list.

An advantage disclosed field device firewalls is that the field device firewall sitting above the field network does not participate in native network communications involving input/output (IO) devices and field devices. Accordingly, customers/users have no need to change their existing field network configuration because a disclosed field device firewalls is added for cyber protection. Flexibility is also provided to switch on/off, or upgrade the firewall functionality on an as-needed basis without impacting field network communication. This also enables customers/users to enforce secure communication without knowledge of device management software to safeguard against unwanted/malicious communication with field devices.

DETAILED DESCRIPTION

Figure 1:
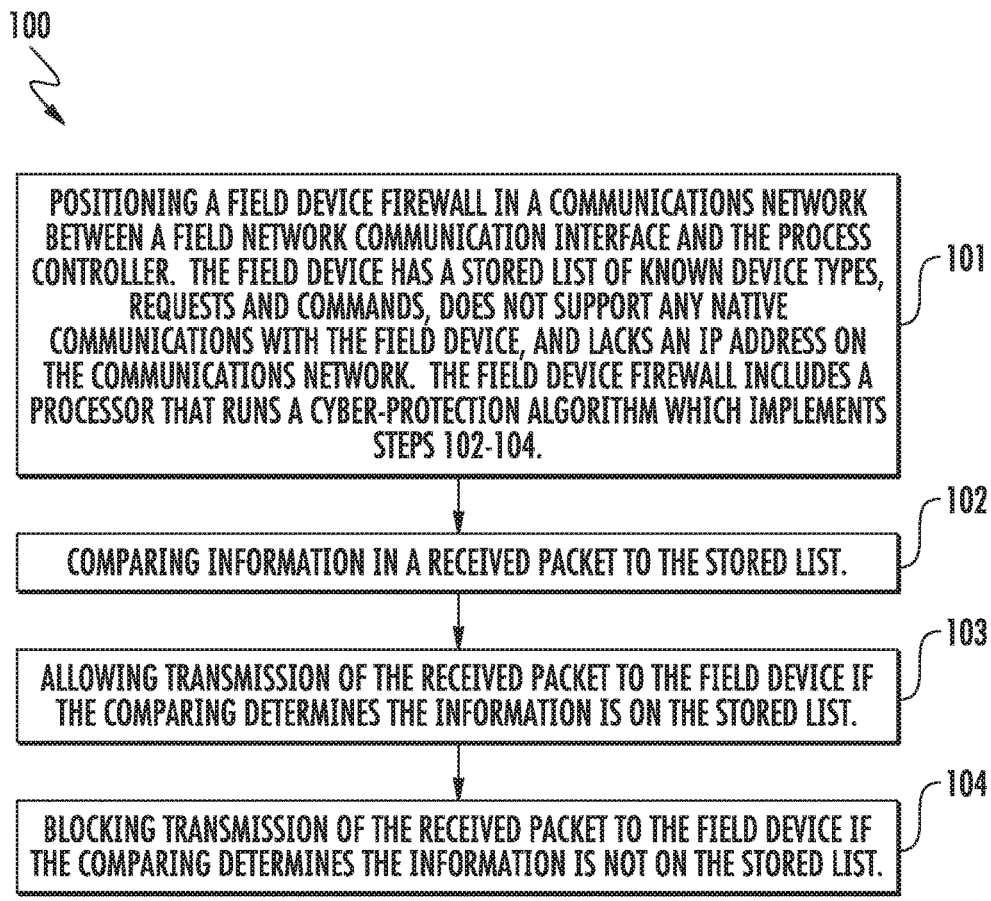
FIG. 1 is flow chart that shows steps in a method of cyber protecting a field device in a process control system including a process controller for controlling the field device which utilizes a communications network with a process communications protocol, according to an example embodiment.

Disclosed embodiments are described with reference to the attached figures, wherein like reference numerals are used throughout the figures to designate similar or equivalent elements. The figures are not drawn to scale and they are provided merely to illustrate certain disclosed aspects. Several disclosed aspects are described below with reference to example applications for illustration. It should be understood that numerous specific details, relationships, and methods are set forth to provide a full understanding of the disclosed embodiments.

One having ordinary skill in the relevant art, however, will readily recognize that the subject matter disclosed herein can be practiced without one or more of the specific details or with other methods. In other instances, well-known structures or operations are not shown in detail to avoid obscuring certain aspects. This Disclosure is not limited by the illustrated ordering of acts or events, as some acts may occur in different orders and/or concurrently with other acts or events. Furthermore, not all illustrated acts or events are required to implement a methodology in accordance with the embodiments disclosed herein.

Also, the terms "coupled to" or "couples with" (and the like) as used herein without further qualification are intended to describe either an indirect or direct electrical connection. Thus, if a first device "couples" to a second device, that connection can be through a direct electrical connection where there are only parasitics in the pathway, or through an indirect electrical connection via intervening items including other devices and connections. For indirect coupling, the intervening item generally does not modify the information of a signal but may adjust its current level, voltage level, and/or power level.

Disclosed embodiments recognize communications networks that use industrial plant protocols such as the commonly used HART protocol need a firewall because of several reasons. Security is not built into HART, there is no standard security encryption method that various HART masters (e.g., multiplexers) adopt, and HART communication is through commands which do not immediately convey whether a command is only reading the device information or actually for making a change. The security features (authentication, authorization) within HART device management software is not sufficient because most of the device management software is based on the WINDOWS Operating System, which in itself is vulnerable to many virus and malwares that can thus lead to unauthorized access to the field devices. When the device management function is performed through web or cloud-based applications/services, the trust factor is lowered due to many known or possible vulnerabilities in web and cloud technologies. Users also do not have control on which commands which are sent during device usage, as they are based on the vendor/device specific information such as Enhanced Device Description (EDD), FDT/DTM, FDI Device Package, and Electronic Data Sheets. HART commands tunneled through secure OPC UA mechanism from device management software (such as FDI or EDD host) to the FDI communication servers can still carry HART write commands which are not intended or expected to ever be blocked.

These cyber-security problems are generally applicable to other relevant smart device protocols besides HART including FOUNDATION FIELDBUS (FF), PROFIBUS/PROFINET, ISA100, MODBUS, and Ethernet IP (EIP) based on the critical sub-systems in which they are used. Commercially there are many safety system deployments where smart devices such as HART compliant devices are used. Protecting safety critical HART and other protocol compliant devices from unwanted configuration changes is of significant importance for the safe working of a plant.

There is no known commercial firewall products based on the HART protocol believed to be available which offers protection from malicious or untrusted software. With the growing IIOT trend in moving many device management services (configuration, maintenance, health monitoring, etc.) to the cloud, it has become important to protect the field devices from misuse. In such a control system deployment, a firewall function at the edge gateway is needed (see control system 350 in FIG. 3 described below).

FIG. 1 is flow chart that shows steps in an example method 100 of cyber protecting a field device in a process control system including a process controller for controlling the field device which utilizes a communications network with a process communication protocol, according to an example embodiment. Step 101 positioning a field device firewall in the communications network between a field network communication interface and the process controller. The field device firewall has a stored list of known device types (e.g., device manufacturer id, device type id), and types of requests and commands. The field device firewall does not support any native communications with the field device, and lacks an IP address on the communications network. The field device firewall includes a processor that runs a cyber-protection algorithm which implements steps 102-104 that works on the security principle of 'whitelisting', which means accepting only known device types, requests or commands from a configured list, and rejecting anything else. The field device firewall is a non-WINDOWS based field device firewall.

Step 102 comprises after decoding the packet comparing the information in a received packet to the stored list. Step 103 comprises allowing transmission of the received packet to the field device if the comparing determines the information is on the stored list. Step 104 comprises blocking transmission of the received packet to the field device if the comparing determines the information is not on the stored list. The blocked transmissions can be logged/stored for later security analysis.

Figure 2:
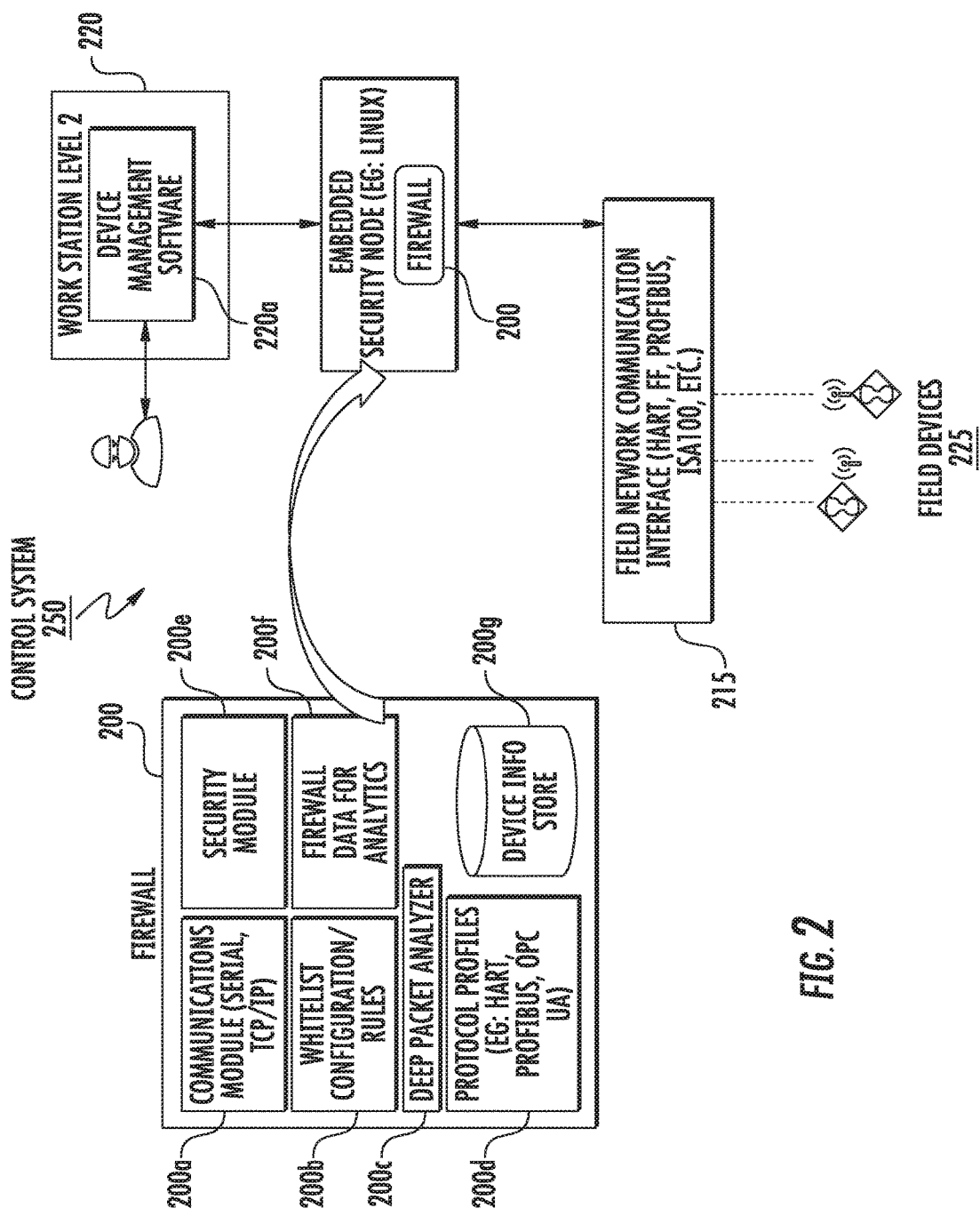
FIG. 2 is an example illustration of a control system including a disclosed field device firewall for cyber protecting field device from intrusion and activities of malicious entities in a standalone deployment.

FIG. 2 is an example illustration of a control system 250 including a disclosed field device firewall 200 for cyber protecting field device(s) 225 from intrusion and activities of malicious entities in a standalone deployment. As known in the art field devices include sensors, valves and actuators. In this embodiment the field device firewall 200 is a standalone transparent security appliance positioned as an embedded security node between device management software 220a run at a workstation station 220 generally associated with a process controller in Purdue Model level 2 (plant supervisory level) of the control system 250 for controlling the field device 225 (at the field level, being level 0 in the Purdue Model) and a field network communication interface 215. The field network communication interface 215 can comprises a multiplexer, serial modem, or an Ethernet IP Gateway, or a future network communication interface or module. Although the device management software 220a is generally associated with a process controller, in a few arrangements it can be independent of the process controller as well.

The control system 250 can be seen to be configured so that all field device communications on the communications network (serial, IP, cloud-based) always must pass through the field device firewall 200. The field device firewall 200 is shown comprising modules including a communications module (e.g., serial, or TCP/IP) 200a responsible for various types of network communications. A whitelist configuration/ rules module 200*b* implements whitelisting, which as described above means accepting only known device types, requests or commands, and rejecting anything else. A deep packet analyzer module 200*c* employs a deep packet inspection (DPI) mechanism to check every field device communication sent for possible violation of configured rules. For this, the field device firewall 200 uses device information which is based on vendor/device specific Field Device Integration (FDI) Packages, EDD, EDS files, or any other custom input files, generally along with OPC UA communication aspects.

The field device firewall 200 includes a protocol profiles module 200*d* that is responsible for providing complete information of supported field protocol communication structures, such as wired/wireless HART FOUNDATION Fieldbus, or OPC UA. A security module 200*e* is responsible for enabling secure communications with for example, digital certificates, trusted logins, permissions/privileges. A firewall data for analytics module 200*f* is responsible for capturing some of the statistics regarding the operation of firewall function itself. For example, how frequently a specific device type or a specific device command has been rejected, how many times the field device firewall 200 has reached its resource limits such as queues, processing capacity, or what is the maximum wait time of requests in the field device firewall queue. A memory 200*g* shown as a device information store in FIG. 2 is responsible for storing appropriate device related information needed for validating against the whitelist configuration/rules. This information is typically either extracted out of an EDD/FDI package or taken from the corresponding protocol specific description files (e.g., Electronic Data. Sheets).

Figure 3:
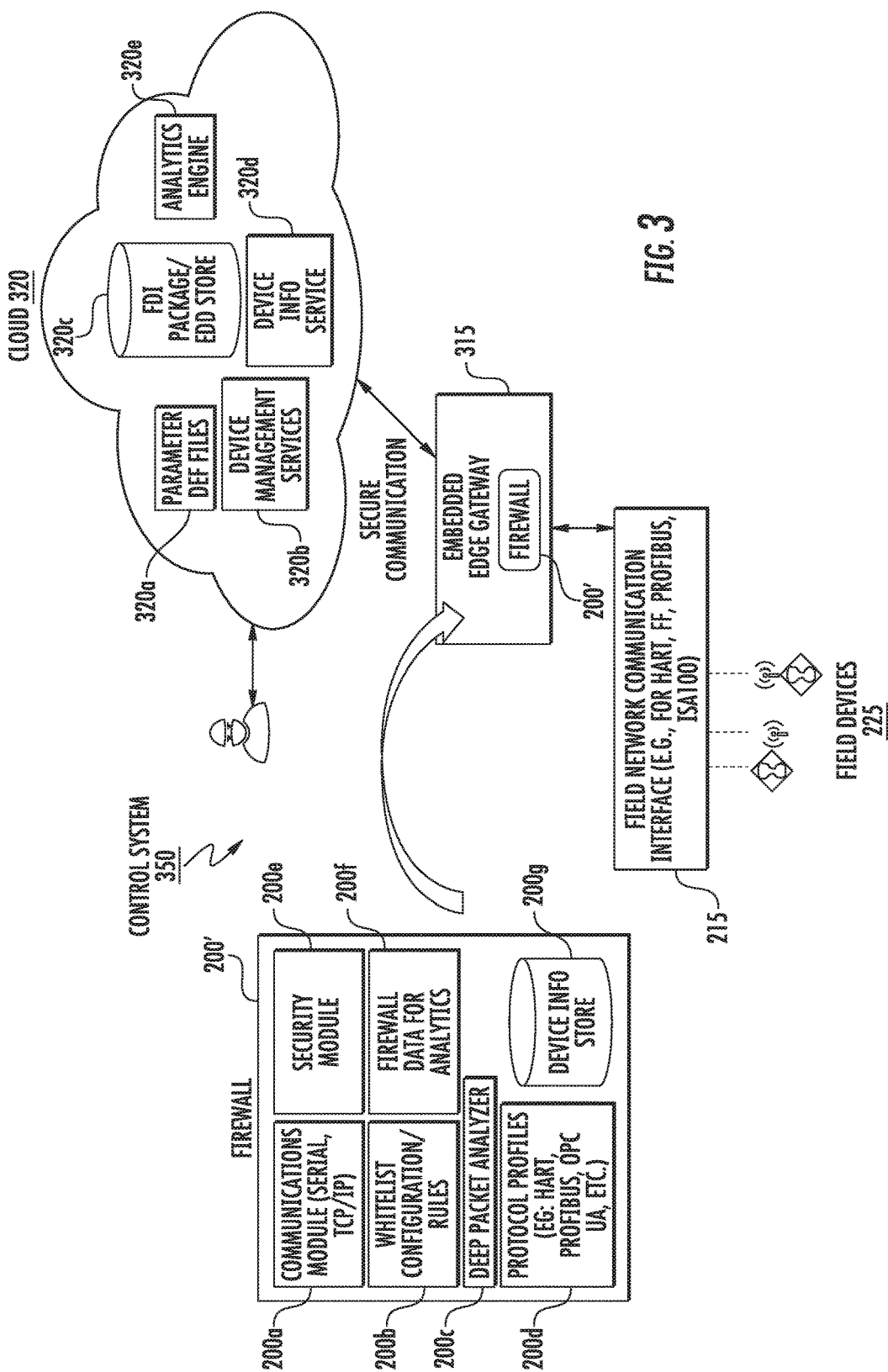
FIG. 3 is an example illustration of a control system including a disclosed field device firewall for protecting a field device from intrusion and activities of malicious entities in a cloud-based deployment, according to an example embodiment.

FIG. 3 is an example illustration of a control system 350 including a disclosed field device firewall 200' for cyber protecting field device(s) 225 from intrusion and activities of malicious entities in a cloud-based deployment, according to an example embodiment. The cloud is not equivalent to the Internet because a cloud can be a private cloud as well as a public cloud. In this embodiment the field device firewall 200' is part of an edge gateway node 315 serving as a device security module in the control system 350.

The primary purpose of field device firewall 200' is to be an TOT module and host the firewall functionality. The data captured by the field device firewall 200' can also be used for security and data analytics. The workstation is shown being in the cloud 320. The cloud 320 is shown including Parameter Definition Files 320*a*, Device Management Services 320*b*, a FDI package/EDD Store 320*c*, a Device Information Service 320*d*, and an Analytics Engine 320*e*. The communication between the edge gateway node 315 and the cloud 320 is a secure communication, typically being encrypted.

Disclosed embodiments can be applied to generally an industrial control system. For example, for petroleum refining, chemical processing, pharmaceutical production, and pulp and paper production.

EXAMPLES

Disclosed embodiments are further illustrated by the following specific Examples, which should not be construed as limiting the scope or content of this Disclosure in any way.

HART is used in this Example. The disclosed field device firewall acts as a shield between device management software (generally at a work station) and HART communication nodes, such as between multiplexers that provide the communication interface and the device management software. The field device firewall works on principles similar to a security products analogous to application whitelisting software that recognizes only configured device types. Anything else is rejected. The field device firewall checks every HART command request packet sent on the network to either allow it to pass-through or reject the packet. The firewall understands the HART command structure including all HART protocol versions, and performs a deep packet inspection (DPI) on the HART command request checking for known device types (e.g., manufacturer id, and device type id).

The field device firewall also validates the HART command in the request packet against the command details and against the whitelist/configuration rules. The firewall forwards the HART command request as-is if the command is a read command, and rejects the HART command request if it is not a read command. How a valid write command gets through depends on the configuration of the Firewall. If the users wants to allow certain valid Write Commands to pass through then the Firewall configuration rules can be provided accordingly.

While various disclosed embodiments have been described above, it should be understood that they have been presented by way of example only, and not limitation. Numerous changes to the subject matter disclosed herein can be made in accordance with this Disclosure without departing from the spirit or scope of this Disclosure. In addition, while a particular feature may have been disclosed with respect to only one of several implementations, such feature may be combined with one or more other features of the other implementations as may be desired and advantageous for any given or particular application.

As will be appreciated by one skilled in the art, the subject matter disclosed herein may be embodied as a system, method or computer program product. Accordingly, this Disclosure can take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, this Disclosure may take the form of a computer program product embodied in any tangible medium of expression having computer usable program code embodied in the medium.

The invention claimed is:

1. A method of cyber protecting a field device in a process control system including a process controller for controlling said field device which utilizes a communications network using a process communication protocol, comprising:

positioning a field device firewall in said communications network between a field network communication interface and said process controller, wherein said field device firewall has a stored list of known device types, types of requests and types of commands, does not support any native communications with said field device, and lacks an IP address on said communications network, said field device firewall including a processor that runs a cyber-protection algorithm implementing:

comparing information including a device type and a type of request or a type of command in a received packet to said known device types, said types of requests or said types of commands in said stored list;

allowing transmission of said received packet to said field device if said comparing determines said information is all on said stored list, and blocking transmission of said received packet to said field device if said comparing determines said information is not all on said stored list.

2. The method of claim 1, wherein said field network communication interface comprises a multiplexer, serial modem, or an Ethernet IP Gateway.

3. The method of claim 1, wherein said known device types include at least one of a device manufacturer identification and a device type identification.

4. The method of claim 1, wherein said process control system is a cloud-based process control system, and wherein said field device firewall is at an edge gateway node that communicates with said cloud-based process control system.

5. The method of claim 1, wherein said process communication protocol comprises a protocol that has hybrid analog and digital signaling.

6. The method of claim 1, wherein said communications network comprises an Ethernet-based data communication network.

7. A field device firewall, comprising:
a processor that runs a cyber-protection algorithm;
a memory having a stored list of known device types, types of requests and types of commands;
wherein said field device firewall is adapted for use in a communications network that uses a process communication protocol between a field network communication interface coupled to a field device and a process controller, and wherein said field device firewall does not support any native communications with said field device and lacks an IP address, said cyber-protection algorithm implementing:
comparing information including a device type and a type of request or a type of command in a received packet to said known device types, said types of requests or said types of commands in said stored list;
allowing transmission of said received packet to said field device if said comparing determines said information is all on said stored list, and
blocking transmission of said received packet to said field device if said comparing determines said information is not all on said stored list.

8. The field device firewall of claim 7, wherein said field network communication interface comprises a multiplexer, serial modem, or Ethernet IP Gateway.

9. The field device firewall of claim 7, wherein the process communication protocol comprises a protocol that has hybrid analog and digital signaling.

10. The field device firewall of claim 7, wherein said field device firewall including a communications module, a whitelist configuration/rules module, a deep packet analyzer module employing a deep packet inspection (DPI) mechanism to check every communication for violation of configured rules, and a protocol profiles module responsible for providing complete information of supported field protocol communication structures.

11. The field device firewall of claim 10, wherein said field device firewall further comprises a security module for enabling secure communications with digital certificates, trusted logins, and permissions or privileges, and a firewall data for analytics module for capturing operating statistics for said field device firewall.

12. A software product, comprising:
a machine readable storage media having code stored therein, said code including executable instructions, which, when executed by a processor causes an associated computing device to implement a cyber-security algorithm that provides a field device firewall for:
comparing information in a received packet including a device type and a type of request or a type of command to a stored list of known device types, types of requests or types of commands;
allowing transmission of said received packet to a field device if said comparing determines said information is all on said stored list, and
blocking transmission of said received packet to said field device if said comparing determines said information is not all on said stored list,
wherein said field device firewall is adapted for use in a communications network that uses a process communication protocol between a field network communication interface coupled to said field device and a process controller, and
wherein said field device firewall does not support any native communications with said field device and lacks an IP address.

13. The software product of claim 12, wherein said field device firewall includes a communications module a whitelist configuration/rules module, a deep packet analyzer module employing a deep packet inspection (DPI) mechanism to check every communication for violation of configured rules, a protocol profiles module responsible for providing complete information of supported field protocol communication structures.

14. The software product of claim 12, wherein said field device firewall further comprises a security module for enabling secure communications with digital certificates, trusted logins, and permissions or privileges, and a firewall data for analytics module for capturing operating statistics for said field device firewall.

15. The software product of claim 12, wherein said process communication protocol comprises a protocol that has hybrid analog and digital signaling.

16. The software product of claim 12, wherein said known device types include at least one of a device manufacturer identification and a device type identification.

* * * * *